United States Patent
Selvaraj (10) Patent No.: US 8,272,027 B2
(45) Date of Patent: Sep. 18, 2012

(54) APPLYING DIGITAL RIGHTS TO NEWLY CREATED ELECTRONIC

(75) Inventor: Senthil Selvaraj, Snoqualmie, WA (US)

(73) Assignee: Ricoh Company, Ltd., Tokyo (JP)

( * ) Notice: Subject to any disclaimer, the term of this patent is extended or adjusted under 35 U.S.C. 154(b) by 1013 days.

(21) Appl. No.: 12/240,669

(22) Filed: Sep. 29, 2008

(65) Prior Publication Data

US 2010/0082971 A1    Apr. 1, 2010

(51) Int. Cl.
G06F 21/04    (2006.01)
G06F 21/24    (2006.01)

(52) U.S. Cl. .................. 726/1; 726/27; 705/52; 705/57

(58) Field of Classification Search ................. None
See application file for complete search history.

(56) References Cited

U.S. PATENT DOCUMENTS

| | | | |
|---|---|---|---|
| 7,284,000 B2 * | 10/2007 | Kuehr-McLaren et al. | 1/1 |
| 7,346,582 B2 * | 3/2008 | Sako et al. | 705/51 |
| 7,698,559 B1 * | 4/2010 | Chaudhury et al. | 713/176 |
| 2003/0046578 A1 * | 3/2003 | Brown et al. | 713/200 |
| 2007/0208665 A1 * | 9/2007 | Ohara | 705/51 |
| 2008/0028448 A1 * | 1/2008 | Tsuchitoi | 726/6 |
| 2008/0174790 A1 * | 7/2008 | Noguchi et al. | 358/1.1 |
| 2008/0263675 A1 * | 10/2008 | McIntyre | 726/28 |
| 2009/0271839 A1 * | 10/2009 | Kanai et al. | 726/1 |
| 2009/0292930 A1 * | 11/2009 | Marano et al. | 713/189 |
| 2009/0319480 A1 * | 12/2009 | Saito | 707/3 |
| 2010/0162349 A1 * | 6/2010 | Kawai | 726/1 |
| 2010/0299759 A1 * | 11/2010 | Kim et al. | 726/28 |
| 2010/0325688 A1 * | 12/2010 | Kakehi et al. | 726/1 |
| 2011/0154063 A1 * | 6/2011 | Tani | 713/193 |

* cited by examiner

*Primary Examiner* — Christopher Revak
(74) *Attorney, Agent, or Firm* — Hickman Palermo Truong Becker Bingham Wong LLP

(57) ABSTRACT

A routing computer is connected to one or more multi-function peripherals (MFPs) on a network. A routing manager located in the routing computer contains user information for users that operate one or more of the MFPs connected on the network. Based on a set of user preferences and or default settings, document data scanned by or received via facsimile for a particular user is sent from one of the MFPs to the routing computer. The routing manager then applies rights management and optional encryption to the destination document created from the document data and sends the destination document to a folder or to one or more individuals via electronic mail. As a result, rights management policy may be applied to newly created documents automatically and before the documents are accessible to users in network storage or by email.

18 Claims, 5 Drawing Sheets

APPLYING DIGITAL RIGHTS TO NEWLY CREATED ELECTRONIC

TECHNICAL FIELD

This disclosure relates generally to processing electronic documents in connection with copying, printing, scanning and facsimile transmission. In particular, this disclosure relates to applying digital rights management to newly created electronic documents.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The use of multi-function peripheral (MFP) devices has proliferated as offices have become more automated and less dependent on manual devices. MFPs have evolved from simple copying devices to document management systems. As many organizations similarly have evolved in size and complexity, these organizations require new systems and methods to organize, track, and control the dissemination of documents.

Partial approaches to handle these issues have been unsatisfactory for many reasons. One approach requires a user to manually apply some type of rights management to a document after the document has been made available to others through a computer network. During the period from document creation until some type of rights management has been applied, the document is at risk of being copied, improperly disseminated, deleted, or even altered.

A user could specify an electronic mail destination for the document. However, documents still travel relatively unsecured; thus important documents could still land in the wrong hands through chicanery such as address spoofing, or merely by accident should an electronic mail address be mis-entered at an MFP.

SUMMARY

Digital rights management and optional encryption is applied to document data scanned or received via facsimile, and the resulting destination document is sent to a folder or to one or more individuals via electronic mail. As a result, rights management policy may be applied to newly created documents automatically and before the documents are accessible to users in network storage or by email.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
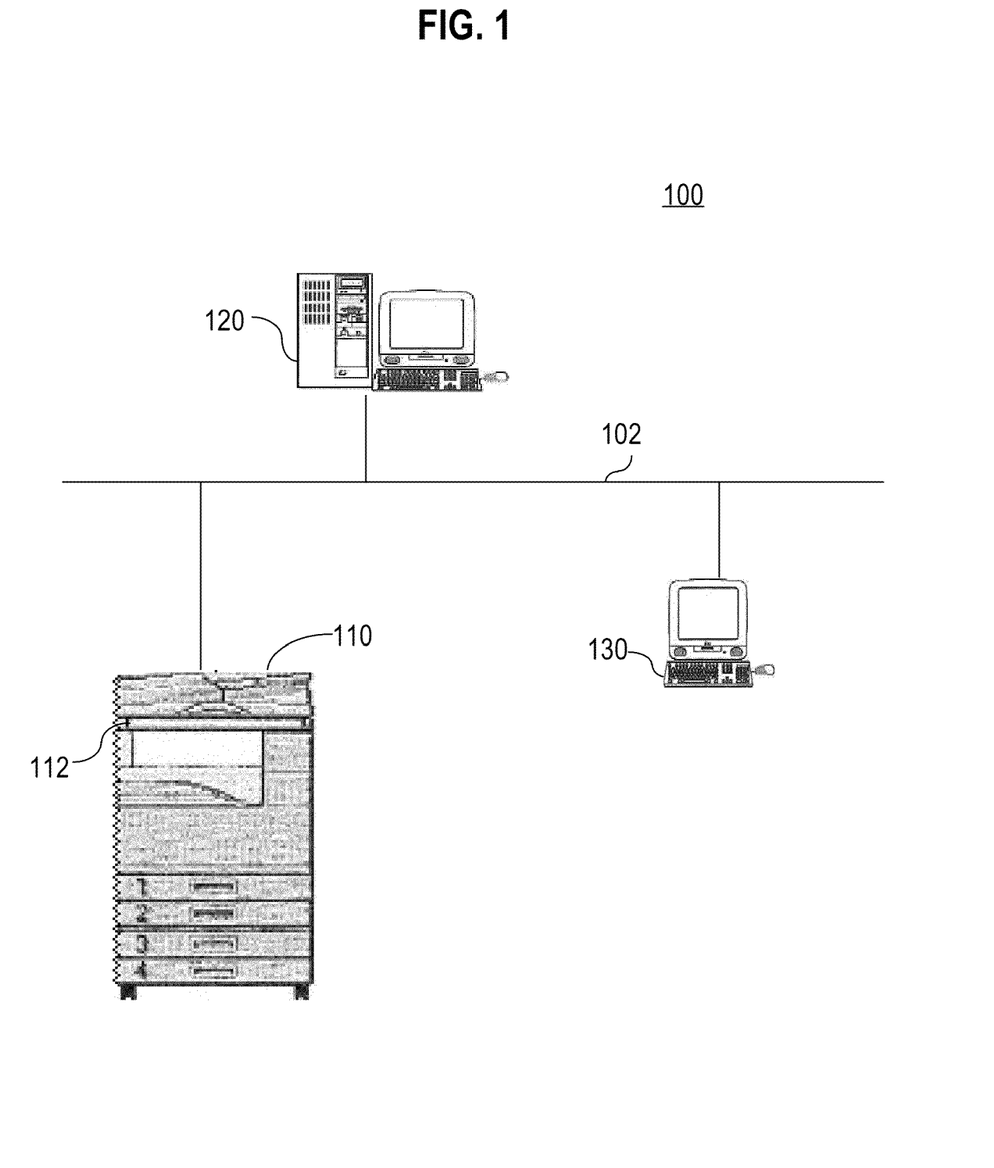
FIG. 1 illustrates a routing computer and multi-function peripheral connected to a network.

Operation of a rights management system from a user perspective is illustrated with respect to FIG. 1. FIG. 1 is a block diagram of a routing computer and multi-function peripheral connected to a network. FIG. 1 depicts system 100 in which a multi-function peripheral (MFP) 110 is connected to a network 102 to which a routing computer 120 and a user computer 130 are connected.

In an embodiment, network 102 is a local area network (LAN). In other embodiments network 102 may comprise a wide area network (WAN) configured with wide area access devices, or the network may be multiple LAN segments of a campus, or other network configurations.

MFP 110 typically provides functions for copying, printing, scanning and facsimile transmission of documents. User access to MFP 110 is provided by a user interface 112 on MFP 110.

In an embodiment, user access to MFP 110 is provided by user computer 130. The user computer 130 may comprise a personal computer or server that provides an administrative interface to functions of MFP 110.

Routing computer 120 is configured to route or transfer electronic documents created using MFP 110 to network 102 and to other computers that are coupled to network 102. For example, network 102 may comprise a mail server that can send electronic mail messages to user computer 130 or other computers on the network. In an embodiment, network 102 also comprises one or more storage devices such as file servers, content servers or storage area network (SAN) units, and routing computer 120 is configured to transfer electronic documents created using MFP 110 to one or more of the storage devices. In an embodiment, one routing computer 120 can manage such operations for MFP 110 and for a plurality of other MFP devices. Other functions of routing computer 120 are described further herein.

To illustrate an example, only one MFP and one user computer are illustrated in FIG. 1, but in actual operation network 102 may contain routing computer 120 connected to, and controlling, a plurality of MFPs and user computers. Further, MFP 110 is shown in FIG. 1 to illustrate an example, but other embodiments may use a copier, printer, scanner, fax machine, or other apparatus configured to create electronic documents, and an MFP is not required. The term "MFP" as used herein may refer broadly to any such device.

In an embodiment, MFP 110, routing computer 120, and user computer 130 comprise logic that can cooperate and interoperate using network 102 to perform document processing and rights management functions for electronic documents. Example functions are now described. In an embodiment, a user is granted access to MFP 110 after providing a sign-on identification and optional parameters (such as password authentication, print job, print job number, or other data) through user computer 130. In an embodiment, the user provides sign-on identification and optional associated parameters through user interface 112 on MFP 110.

Once access to MFP 110 is granted, the user is able to perform scanning, copying, printing, and facsimile transmission operations through MFP 110. For example, upon selection of a scanning operation, the user is prompted to select the document destination either as location in network 102, such as a folder, directory, or other repository, or a destination address selected from a list, such as an electronic mail (e-mail) address. In other embodiments, the selected location may comprise an identifier of an application program, process, or system.

In an embodiment, the user may select a destination folder from a plurality of destination folders. In an embodiment, the user may manually input a destination electronic mail address. In an embodiment, the document destination is pre-selected for the user. The pre-selected destination may be based on user profile information associated with the sign-on identification that the user provided.

In an embodiment, upon receipt of a facsimile whose recipient is unknown, the document destination selected is a default destination.

In an embodiment, prior to commencement of the scanning or facsimile receipt operation, the user is additionally prompted to specify the type of rights management desired (if any) for the resulting document. For example, the user may specify one or more of the following rights for the resulting document: print, edit, copy, and read. For example, the user may specify the resulting document can be read and copied, but not printed or edited. In an embodiment, the user may specify the rights for one or more individuals based on user names or other identifiers. For example, the user may specify that Bob and Carol can read the document, and that Ted and Alice can read and print the document; by implication, Bob and Carol cannot print the document, Ted and Alice cannot edit the document, and all of them cannot copy the document. In an embodiment, the rights management features are pre-selected for the user.

In an embodiment, upon receipt of a facsimile whose recipient is unknown, the rights management features selected are default rights management features.

In an embodiment, prior to commencement of the scanning or facsimile receipt operation, the user is additionally prompted to specify that a type and level of encryption (if any) for the resulting document. In an embodiment, encryption is pre-selected for the user.

In an embodiment, the user is also permitted to select the format of the resulting document. For example, the user might select a word-processing format, in which the scanning or facsimile receipt operation would be accompanied by application of one or more optical character recognition (OCR) programs to produce the resulting document.

After the user has answered all applicable prompts for information such as destination, rights, and encryption, the user commences the scanning or facsimile receipt operation. As a result, an electronic document is newly created in accordance with the applicable prompts selected and any additional default settings. For example, a user may place a paper document into MFP 110, and activate a SCAN operation; in response, the MFP creates an electronic document representing a scanned image or other digital representation of the paper document. The installation and configuration of both routing computer 120 and MFP 110 are now described below.

Figure 2:
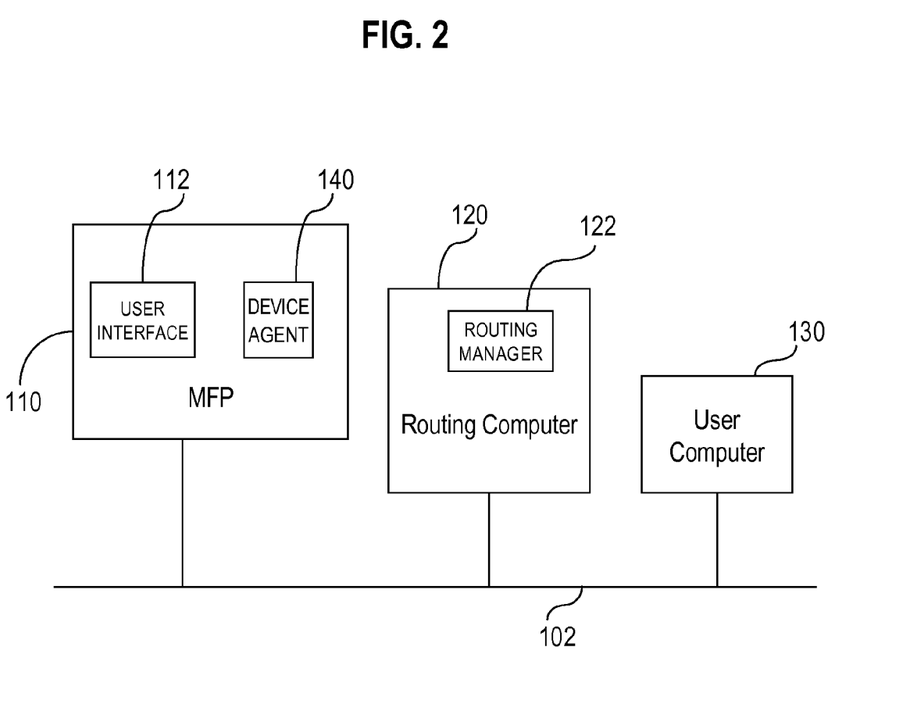
FIG. 2 illustrates hardware and software components of the routing computer and multi-function peripheral connected to a network.

FIG. 2 is a block diagram of the hardware and software components of the routing computer and multi-function peripheral connected to a network.

Routing computer 120 may be any computer having sufficient hardware and networking capacities to perform routing and rights management tasks. For example, a personal computer configured with the "ScanRouter EX Enterprise" software package commercially available from Ricoh USA, Inc., West Caldwell, N.J., and operating in a Microsoft Windows Server environment would provide a suitable platform. Routing computer 120 may comprise a server. Routing computer 120 is configured with a routing manager 122 that provides rights management and encryption functions. Routing manager 122 may be implemented in firmware, hardware, software, or any combination thereof that implements the functions described herein and in connection with FIG. 3, FIG. 4. In an embodiment, routing manager 122 is implemented in one or more computer programs, processes or other software elements.

Figure 3:
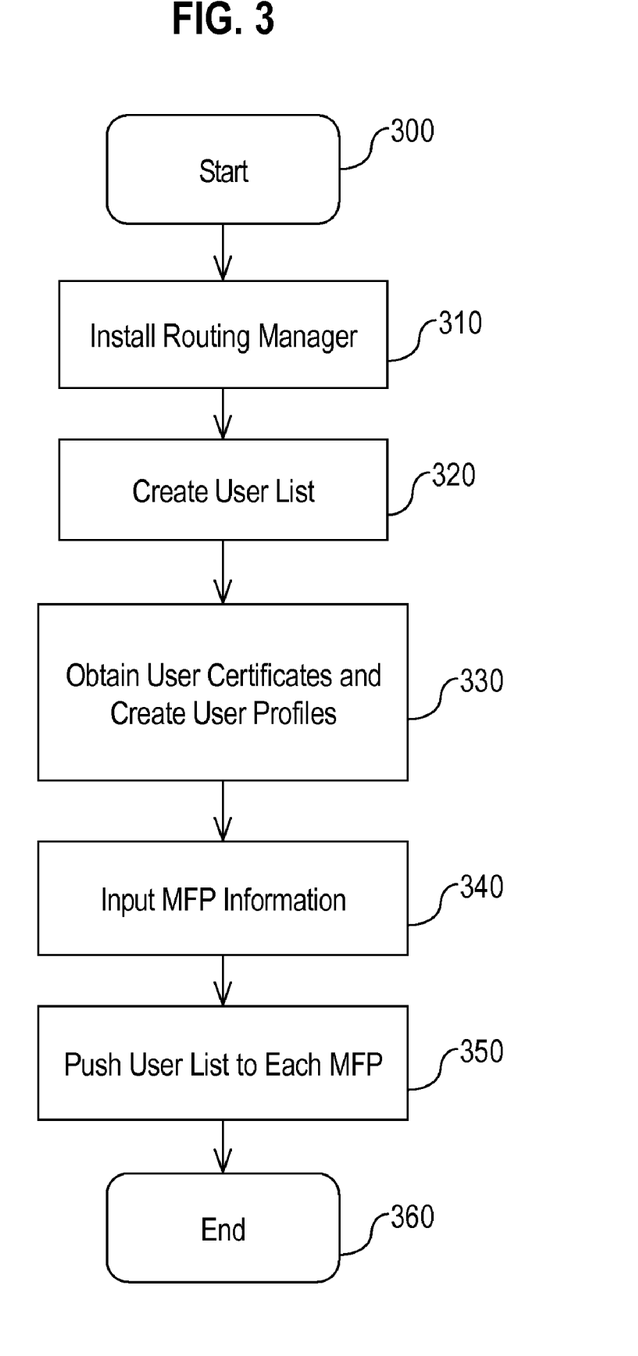
FIG. 3 illustrates an example of the steps involved in a software installation of a device manager on a routing computer.

FIG. 3 illustrates an example of the steps involved in a software installation of a device manager on a routing computer. Thus, an example of the steps involved in the installation and configuration of routing manager 122 is depicted in FIG. 3.

The installation and configuration of routing manager 122 begins at step 300. In step 310, routing manager 122 is installed on routing computer 120. Installation may comprise copying an executable copy of routing manager 122 from a master disk to a hard disk of routing computer 120, downloading a copy of the routing manager, or using a wizard to install the routing manager from an installation medium. Routing manager 122 includes instructions configured for performing document routing functions for one or more MFPs connected to a network. For example, routing manager 122 is configured to receive each newly created electronic document from MFP 110 as a result of a user scanning a document or generating an electronic copy of a document using the MFP, and to route the electronic document to a destination system, network location, or address.

Additionally, routing manager 122 is configured to perform rights management functions for newly created and received electronic documents. For example, routing manager 122 can apply rights management metadata to a received electronic document by issuing appropriate function calls to rights management and encryption services. In an embodiment, the rights management and encryption services are hosted on routing computer 120. In an embodiment, the rights management and encryption services are provided by an operating system, such as Microsoft Windows Server 2003 or Server 2008, residing on routing computer 120. For example, Microsoft Windows Rights Management Services (RMS) for Windows Server 2003 may be used and routing manager 122 may comprise an RMS-enabled application.

Referring again to FIG. 3, in an embodiment, steps 320 through 350 are performed in conjunction with an initial configuration program included in routing manager 122. In step 320, a list of users for whom rights management polices are desired is input to routing manager 122, along with electronic mail address information for each user. In various embodiments, step 320 may comprise entering individual user names, batch loading a list of user names, entering a user name that represents a group, such as "sales@ricoh-usa.com", entering a group alias recognizable to a messaging server, etc.

In step 330, a user profile is created for each user. The user profile generally comprises a set of metadata for a user that indicate document processing settings, encryption parameters, preferences and requirements for rights management. The user profile may be stored in data storage hosted by routing computer 120 or on network 102. In an embodiment, the user profile contains one or more of the following: (1) MFP properties such as supported file types; (2) default user rights, if applicable; and (3) a user digital certificate, obtained from a local computer operating as the rights management server, which could include routing computer 120, or a rights management service such as Microsoft Passport.

In an embodiment, the MFP properties indicate, for example, a name or network address or other unique identifier for a particular MFP with which the user is permitted to work, types of files that MFP 110 can generate when operated by the particular user, such as PDF files, Joint Photographic Experts Group (JPEG) images, and other MFP-related data. The default user rights might comprise, for example, Print/Read/Edit/Copy rights for one particular user, or only Read rights for another particular user. Thus, data in the user profile can establish different default rights applicable to all documents created by the associated user. In an embodiment, the user digital certificate may comprise a public key for the user signed by a trusted authority, for use in public key encryption of documents that the user generates with the MFP.

In step 340, information is input to routing manager 122 identifying one or more MFPs or data input devices that are connected to routing computer 120 by network 102 or otherwise managed by the routing computer. For example, step 340 may comprise providing routing manager 122 with a network address, device address, name, or other identifying data for MFP 110 and zero or more other MFPs, scanners, or other data input devices.

In step 350, a user list for each MFP is transferred to the corresponding MFP. In an embodiment, a user list resides on device agent 140 of each MFP 110, and routing manager 122 is configured to automatically generate a user list for each MFP based on the user profile data, and to send the user lists to the corresponding MFPs. As a result, each MFP becomes configured with user profile data for all users that are authorized to sign into and use that MFP. An added benefit of this approach is that no modifications to existing MFPs are required.

The installation and configuration procedure ends at step 360, and the MFP 110 and routing computer 120 are ready for use.

Figure 4:
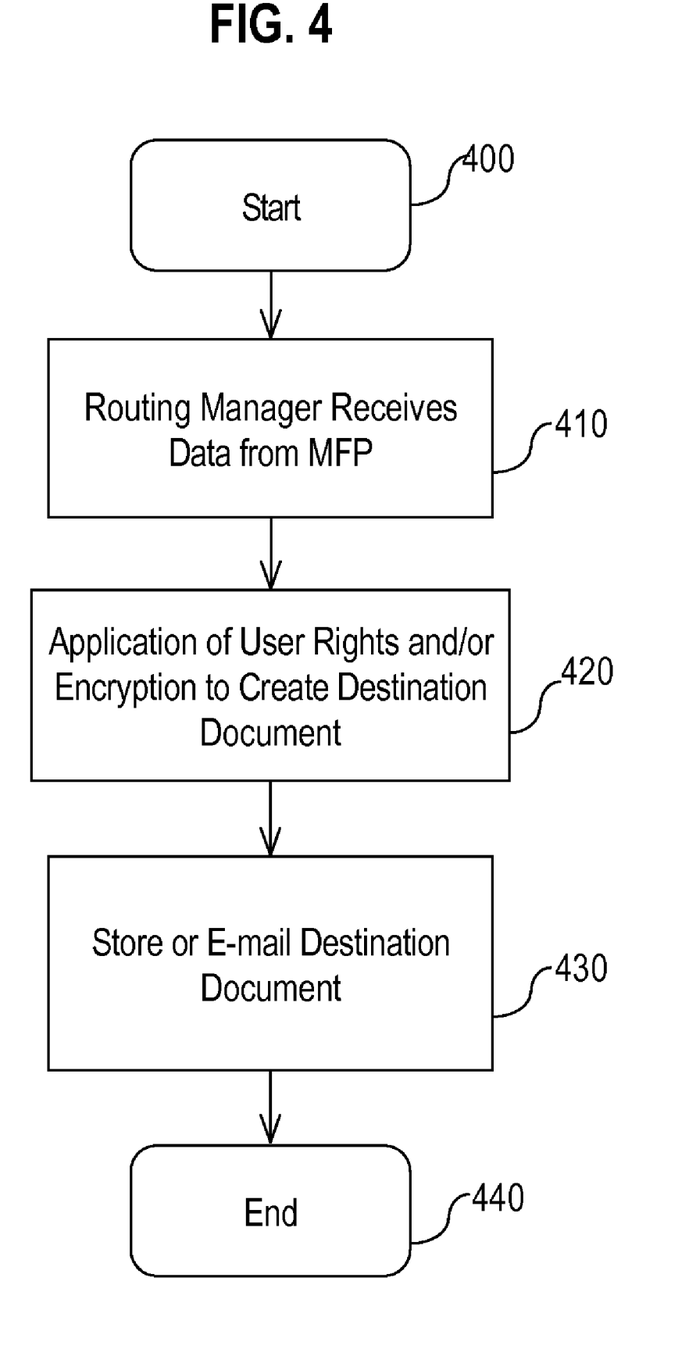
FIG. 4 illustrates application of rights management and encryption as part of a scanning operation.

FIG. 4 illustrates application of rights management and encryption as part of a scanning operation. For example, FIG. 4 depicts application of rights management and encryption as part of a scanning operation, or a facsimile receiving operation, on an MFP after installation and configuration of routing computer 120.

Step 400 corresponds to the start of application of rights management and encryption. Typically, step 400 begins during or immediately after MFP 110 completes document scanning or receiving a facsimile.

In step 410, MFP 110 sends document data corresponding to the paper document that was scanned, or corresponding to data received via facsimile, along with a user identification, through network 102 to routing manager 122 in routing computer 120. The document data may broadly comprise any data processed by a user. The user identification indicates which user was signed in to the MFP at the time an operation occurred. If the MFP 110 receives a facsimile during unattended operation, then the user identification may indicate an administrative user, or may comprise a generic identifier of the MFP.

In step 420, rights management policy is applied to the document data to create a destination document. Applying rights management policy may comprise determining the rights management policy from stored user profile data associated with the user identification received with the electronic document. Applying rights management policy may comprise generating and attaching rights management metadata to the electronic document. In an embodiment, the destination document has the format of an "xpf" file format for use under a Windows Server operating system in which rights management metadata is bound to content data of the electronic document. Additionally or alternatively, applying rights management policy also may comprise encrypting the electronic document. For example, Diffie-Hellman public key encryption techniques may be used to encrypt the electronic document using a public key of the user, obtained from the user profile data. In some embodiments, symmetric key encryption may be used, using an encryption key that is pre-provisioned in the routing computer 122 or retrieved from secure storage.

In an embodiment, a file corresponding to the document data, and part or all of the applicable user profile are passed or made available to one or more rights modules supplied by the operating system residing on MFP 110. After processing, the one or more rights modules return the destination document to routing manager 122 with rights management metadata attached, or in encrypted form, or otherwise processed according to rights management policy.

In this approach, the routing manager 122 is responsible for determining rights management policy for a user and document, and applying the rights management policy promptly after receiving a newly created electronic document and before transferring the electronic document to storage or by email. The rights management policy is applied automatically and the MFP 110 is not required to interface directly to a rights management system, or to call RMS functions of an operating system. Further, there is no appreciable delay between the MFP 110 creating a new electronic document and applying the rights management policy. The newly created electronic document does not appear in networked data storage or in an email system until the routing computer 120 applies the rights management policy, and therefore it is not possible for an unauthorized user to misuse the newly created document before another user has a chance to apply rights management policy or metadata to the document.

In step 430, the destination document is transferred from the routing computer to a destination. For example, in various embodiments, the destination document is stored in a default network folder location, or stored in the folder specified by the user, or is sent via electronic mail to one or more electronic mail addresses specified by the user. More generally, step 430 comprises applying any of one or more optional file commands to the document.

The approaches described herein permit the automatic application of rights management policy to documents created by MFPs in a manner designed to easily fit into any office workflow environment, with simple installation, and with minimal or no hardware upgrade requirements. Rights management policy is immediately applied to a newly-created electronic document just after the document is scanned or generated using an MFP, and before a user can access the document using networked resources. The newly-created electronic document from the MFP is transferred to data storage in a networked folder or other storage location, or sent by email, only after rights management policy is applied. Thus, it is not possible for a user to access or use the newly-created electronic document between the time that the MFP creates the document and the time that the document is received in storage or received by e-mail.

Figure 5:
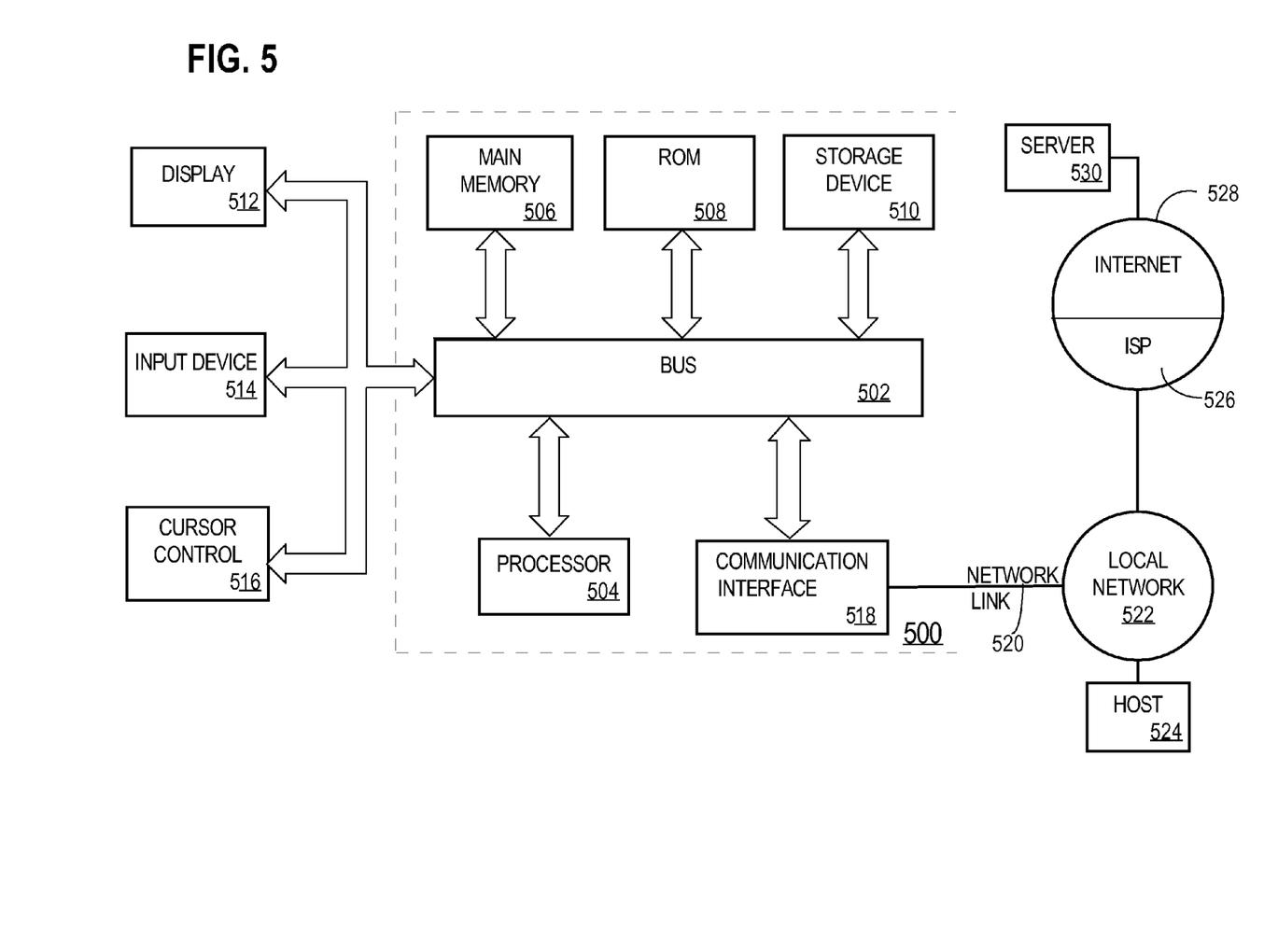
FIG. 5 illustrates a computer system on which embodiments of the invention may be implemented.

The approach described herein for performing rights management on scanned documents or documents received via facsimile may be implemented on any type of computing platform or architecture. To illustrate an example, FIG. 5 is a block diagram that depicts an example computer system 500 upon which embodiments of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 500, various computer-readable media are involved, for example, in providing instructions to processor 504 for execution. Such a medium may take many forms, including but not limited to, tangible data storage media such as non-volatile media and volatile media. Non-volatile media includes, for example, optical or magnetic disks, such as storage device 510. Volatile media includes dynamic memory, such as main memory 506. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A server comprising:
a network interface configured for communication with one or more multifunction printing devices (MFPs) connected to a network; and
a routing manager unit operatively connected to the network interface, and configured to:
transfer a list of user identifications authorized to access the network to each MFP on the network,
receive from the MFP document data and a user identification and attach rights management metadata to the document data to form destination document data, or receive from the MFP destination document data with rights management metadata attached,
   wherein the rights management metadata is derived from user profile data associated with the user identification, and
   wherein the user profile data is a set of metadata that indicates preferences and requirements for rights management, and
   transfer the destination document data to a destination on the network according to the rights management metadata.

2. The server of claim 1, wherein the rights management metadata causes one or more of the following:
   encrypting the data to form the destination document; and
   storing embedded rights in the destination document.

3. The server of claim 2, wherein the embedded rights in the destination document includes metadata that enables one or more of the following:
   access to the destination document to be restricted to one or more recipients; and
   grant or denial of permission to perform one or more of the following operations on the destination document: copy, electronically mail, print, and edit.

4. The server of claim 1, wherein transferring the destination document data includes one or more of the following:
   storing the destination document at one or more locations on the one or more networks; and
   electronically mailing the destination document to one or more destinations.

5. The server of claim 1, wherein the document data results from a scanning operation.

6. The server of claim 1, wherein the document data is data resulting from a facsimile operation.

7. A computer-implemented method comprising:
   receiving document data and a user identification;
   attaching rights management metadata to the document data to form a destination document,
      wherein the document data and user identification is derived from a multifunction printing device,
      wherein the rights management metadata is derived from user profile data associated with the user identification, and
      wherein the user profile data is a set of metadata that indicates preferences and requirements for rights management, and
   transferring the destination document data to a destination on the network according to the rights management metadata.

8. The computer-implemented method of claim 7, wherein applying the rights management policy includes one or more of the following:
   encrypting the data to form the destination document; and
   storing embedded rights in the destination document.

9. The computer-implemented method of claim 8, wherein the embedded rights in the destination document includes metadata that enables-one or more of the following:
   access to the destination document to be restricted to one or more recipients; and
   grant or denial of permission to perform one or more of the following operations on the destination document: copy, electronically mail, print, and edit.

10. The computer-implemented method of claim 7, wherein transferring the destination document to a destination includes one or more of the following:
   storing the destination document at one or more locations on the one or more networks; and
   electronically mailing the destination document to one or more destinations.

11. The computer-implemented method of claim 7, wherein the document data results from a scanning operation.

12. The computer-implemented method of claim 7, wherein the document data corresponds to data resulting from a facsimile operation.

13. A non-transitory computer-readable storage medium storing instructions for applying digital rights management to newly created electronic documents, wherein execution of the instructions by one or more processors configures the one or more processors to:
   receive document data and a user identification;
   attach rights management metadata to the document data to form a destination document,
      wherein the document data and user identification is derived from a multifunction printing device,
      wherein the rights management metadata is derived from user profile data associated with the user identification, and
      wherein the user profile data is a set of metadata that indicates document processing settings, encryption parameters, preferences and requirements for rights management, and;
   transfer the destination document data to a destination on the network according to the rights management metadata.

14. The non-transitory computable-readable storage medium of claim 13, wherein configuring the one or more processors to apply the rights management policy includes configuring the one or more processors to perform one or more of the following:
   encrypting the data to form the destination document; and
   storing embedded rights in the destination document.

15. The non-transitory computer-readable storage medium of claim 14, wherein the embedded rights in the destination document includes metadata that enables one or more of the following:
   access to the destination document to be restricted to one or more recipients; and
   grant or denial of permission to perform one or more of the following operations on the destination document: copy, electronically mail, print, and edit.

16. The non-transitory computer-readable storage medium of claim 13, wherein transferring the destination document to a destination includes one or more of the following:
   storing the destination document at one or more locations on the one or more networks; and
   electronically mailing the destination document to one or more destinations.

17. The non-transitory computer-readable storage medium of claim 13, wherein the document data results from a scanning operation.

18. The non-transitory computer-readable storage medium of claim 13, wherein the document data corresponds to data resulting from a facsimile operation.

* * * * *

UNITED STATES PATENT AND TRADEMARK OFFICE
CERTIFICATE OF CORRECTION

| | |
|---|---|
| PATENT NO. | : 8,272,027 B2 |
| APPLICATION NO. | : 12/240669 |
| DATED | : September 18, 2012 |
| INVENTOR(S) | : Senthil Selvaraj |

Page 1 of 1

It is certified that error appears in the above-identified patent and that said Letters Patent is hereby corrected as shown below:

On the title page, item (54) and in the specification, Column 1, delete "APPLYING DIGITAL RIGHTS TO NEWLY CREATED ELECTRONIC" and insert -- APPLYING DIGITAL RIGHTS TO NEWLY CREATED ELECTRONIC DOCUMENTS --

In the Drawings:

On Sheet 1 of 5, delete "Fig. 1" and insert -- Fig. 1, filed on 11/24/2008 --

In the Specifications:

In Column 5, line 62, delete "work interface, and configured to" and insert -- work interface and configured to --

In Column 10, line 27, delete "document processing settings, encryption parameters,"

Signed and Sealed this
Thirtieth Day of April, 2013

Teresa Stanek Rea
*Acting Director of the United States Patent and Trademark Office*